O. KUEKES.
DETACHABLE HANDLE.
APPLICATION FILED NOV. 16, 1912.
1,066,923.
Patented July 8, 1913.
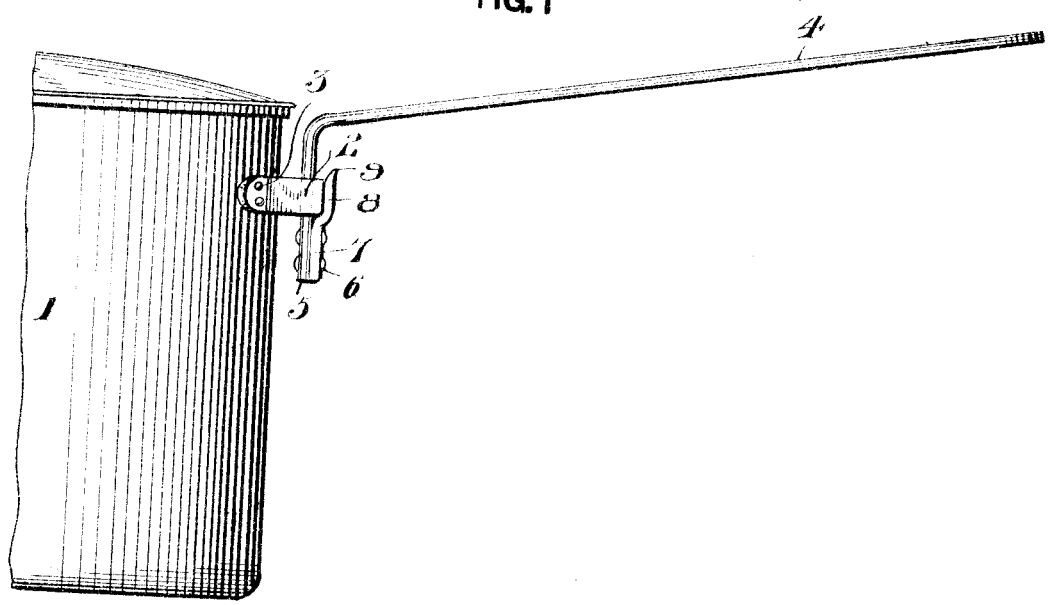
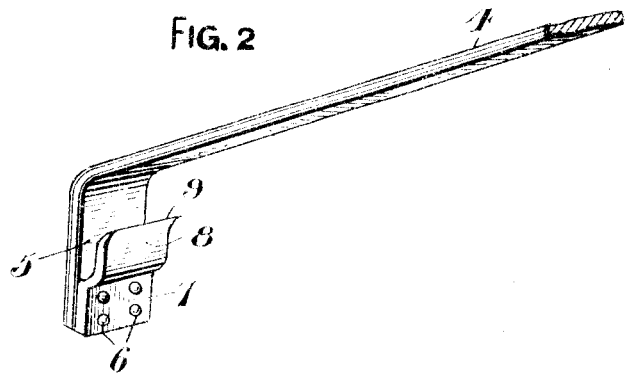

UNITED STATES PATENT OFFICE.

OTTO KUEKES, OF PITTSBURGH, PENNSYLVANIA.

DETACHABLE HANDLE.

1,066,923.  Specification of Letters Patent.  Patented July 8, 1913.

Application filed November 16, 1912. Serial No. 731,830.

*To all whom it may concern:*

Be it known that I, OTTO KUEKES, a citizen of the United States of America, residing at Pittsburgh, in the county of Allegheny and State of Pennsylvania, have invented certain new and useful Improvements in Detachable Handles, of which the following is a specification, reference being had therein to the accompanying drawing.

This invention relates to handles for cooking utensils, and the primary object of my invention is to provide a simple and inexpensive detachable handle that can be easily and quickly connected to a utensil whereby the utensil can be safely carried.

Another object of this invention is to furnish a culinary vessel with a detachable handle that permits of the handle being removed whereby the vessel will occupy a comparatively small space when not in use or during shipment.

A further object of this invention is to accomplish the above results by a mechanical construction that will be hereinafter specifically described and then claimed.

Reference will now be had to the drawing, wherein:—

Figure 1 is a side elevation of a portion of a utensil provided with a detachable handle, and Fig. 2 is a perspective view of a portion of a handle.

To put my invention into practice, I provide the side of a utensil or vessel 1 with a strap 2 adjacent to the upper edge thereof, said strap being made of metal and riveted or otherwise secured to the vessel, as at 3.

The detachable handle comprises a bar 4 having an angularly disposed end 5 and riveted or otherwise secured to the end of said bar, as at 6 is a plate 7 having an offset flange 8 that is in parallelism with the end of the bar 4. The edge of the flange 8 is beveled as at 9, and said flange corresponds in width to the bar 4. The plate 7 is secured upon the inner side of the end 5 and by offsetting the plate what may be termed a socket with its operative end directed upwardly is arranged upon the inner side of the angular end 5 of the handle.

The strap 2 is spaced apart from the wall of the vessel 1 whereby the end 5 of the handle bar can be easily inserted between the vessel and the strap, then by moving the handle bar slightly away from the vessel and then raising said bar, the strap will be positioned between the end of said bar and the flange 8, as shown in Fig. 1. With the strap 2 of a depth corresponding to the flange 8, the vessel 1 can be easily lifted by the handle. There is no danger of the vessel tilting while being carried by the handle and after the vessel has been placed upon a table or other support, the handle can be detached and used for lifting other vessels.

It is thought that the utility of a detachable handle in accordance with this invention will be apparent without further description, and I would have it understood that the invention is susceptible to such structural changes as fall within the scope of the appended claim.

What I claim is:—

In detachable handles for vessels a strap adapted to have its ends secured to and further projecting from the side of a vessel, a handle bar having a depending angularly disposed end adapted to extend between the strap and the vessel, and means secured to said depending end of said bar to provide a socket upon the inner side of said depending end and with its operative end projecting upward, said socket adapted when the bar is raised to receive said strap whereby the vessel can be elevated.

In testimony whereof I affix my signature in the presence of two witnesses.

OTTO KUEKES.

Witnesses:
 MAX H. SROLOVITZ,
 KATHERINE ERRETT.